(12) United States Patent
Pfluger

(10) Patent No.: US 11,624,669 B2
(45) Date of Patent: Apr. 11, 2023

(54) PRESSURE SENSOR FOR HIGH PRESSURES

(71) Applicant: KISTLER HOLDING AG, Winterthur (CH)

(72) Inventor: Kim Pfluger, Winterthur (CH)

(73) Assignee: KISTLER HOLDING AG, Winterthur (CH)

( * ) Notice: Subject to any disclaimer, the term of this patent is extended or adjusted under 35 U.S.C. 154(b) by 92 days.

(21) Appl. No.: 15/677,289

(22) Filed: Aug. 15, 2017

(65) Prior Publication Data

US 2022/0099511 A1 Mar. 31, 2022

(30) Foreign Application Priority Data

Aug. 17, 2016 (EP) ..................................... 16184564

(51) Int. Cl.
  *G01L 19/14* (2006.01)
  *G01L 9/00* (2006.01)

(52) U.S. Cl.
  CPC .............. *G01L 9/008* (2013.01); *G01L 19/14* (2013.01)

(58) Field of Classification Search
  CPC ............................... G01L 19/008; G01L 19/14
  See application file for complete search history.

(56) References Cited

U.S. PATENT DOCUMENTS

| 3,461,327 | A | 8/1969 | Zeiringer |
| 3,801,838 | A | 4/1974 | Kistler |
| D931,748 | S | * 9/2021 | Pfluger .......................... D10/87 |
| 2010/0294028 | A1 | 11/2010 | Siegenthaler et al. |
| 2015/0034039 | A1 | 2/2015 | Takahashi et al. |
| 2018/0031429 | A1* | 2/2018 | Pfluger ...................... G01L 1/16 |
| 2019/0271124 | A1* | 9/2019 | Simons .................... E01F 11/00 |
| 2019/0331543 | A1* | 10/2019 | Cavalloni ............... G01L 5/167 |
| 2020/0096382 | A1* | 3/2020 | Pfluger ..................... G01L 1/16 |
| 2020/0271531 | A1* | 8/2020 | Cavalloni ........... H01L 41/0835 |
| 2021/0181040 | A1* | 6/2021 | Pfluger ................ G01G 19/024 |

FOREIGN PATENT DOCUMENTS

WO  WO 2015/147061  10/2015

OTHER PUBLICATIONS

European Search Report (EP 16184564.9), dated Jan. 31, 2017.

* cited by examiner

*Primary Examiner* — Jamel E Williams
(74) *Attorney, Agent, or Firm* — Dority & Manning, P.A.

(57) ABSTRACT

A pressure sensor for capturing pressures of up to 1000 bar includes a sensor assembly and a housing sleeve for accommodating the sensor assembly. Furthermore, the pressure sensor includes a membrane in mechanical connection with the housing sleeve and operative connection with the sensor assembly for transmitting a pressure. Pressure acts in an axial direction on the membrane and in a radial direction on the housing sleeve. The housing sleeve includes a constriction which locally increases an elasticity of the housing sleeve. The housing sleeve includes a reinforcement which locally reduces an elasticity of the housing sleeve. At high pressure, locally induced changes in the elasticity of the housing sleeve result in a reversible change in length of the housing sleeve, both in the radial direction and in the axial direction.

19 Claims, 3 Drawing Sheets

PRESSURE SENSOR FOR HIGH PRESSURES

CROSS-REFERENCE TO RELATED APPLICATIONS

This application claims priority to EP Application No. 16184564.9, filed Aug. 17, 2016.

FIELD OF THE INVENTION

The invention relates to a pressure sensor for capturing pressures of up to 1000 bar.

BACKGROUND

Pressure sensors are well known and widely used. In particular, piezoelectric pressure sensors typically are able to detect pressures in the range of 150 bar to 250 bar. The pressure is recorded as a pressure change as a function of time with a temporal resolution of up to 100 kHz. Piezoelectric pressure sensors are not only useful for determining a cylinder pressure in internal combustion engines, such as gasoline engines, diesel engines, Wankel engines, etc., but also for monitoring the pressure in jet engines, gas turbines, steam turbines, steam engines, etc.

Such a piezoelectric pressure sensor is disclosed in the patent document CH394637A. The piezoelectric pressure sensor comprises a membrane welded at its edge to a housing of the piezoelectric pressure sensor. The pressure acting on the membrane is transmitted via a bottom portion to a piezoelectric crystal assembly inside the housing. To keep a force shunt towards the housing low, the membrane comprises an annular indentation between the bottom portion and the housing. Pressure acting on the piezoelectric crystal assembly generates electric polarization charges that are captured as measured signals via a Bourdon tube. The measured signals are proportional to the amount of pressure. An electrical conductor transfers the measured signals from the Bourdon tube to a socket for a plug connector of a signal cable leading to an evaluation unit. The socket is located on a side of the housing that is opposite to the membrane.

The membrane is often the critical component of a piezoelectric pressure sensor. Although the membrane usually undergoes only small deformations in operation, it suffers high mechanical stresses due to its small thickness and generally determines the useful life of the piezoelectric pressure sensor. Furthermore, a membrane can be challenging in manufacture if indentations or complex geometries must be fabricated. Generally, a simple disc-shaped membrane is unable to withstand high pressures over a prolonged lifetime if conventional housings are used, one reason for this being that at high pressure these housings themselves undergo deformations and thereby contribute to the mechanical stresses exerted on the membrane.

BRIEF SUMMARY OF THE INVENTION

The object of the invention is to at least in part overcome the drawbacks inherent to the prior art. In particular, a pressure sensor is desirable which comprises a simple disc-shaped and inexpensive membrane and which is able to withstand high pressures, especially up to at least 1000 bar, while having a lifetime of at least $10^6$ load cycles, in particular.

This object has been achieved by the features defined in the independent claim. The pressure sensor according to the invention which is particularly suitable for capturing pressures of up to 1000 bar, comprises a sensor assembly and a housing sleeve for accommodating the sensor assembly. Furthermore, the pressure sensor comprises a membrane for transferring the pressure, said membrane being in operative connection with the sensor assembly such that pressure acting on the membrane produces a sensing operation by the sensing assembly. The membrane is in mechanical connection with the housing sleeve. Moreover, pressure acts in an axial direction of the pressure sensor on the membrane and in a radial direction on the housing sleeve of the pressure sensor. In addition, the housing comprises a constriction which results in a local increase in elasticity of the housing sleeve. And/or the housing comprises a reinforcement which locally reduces an elasticity of the housing sleeve. At high pressure a reversible change in length of the housing sleeve occurs both in the radial and the axial direction due to the locally reduced and/or increased elasticity of the housing sleeve.

Elasticity is intended to mean an ability of a material to change its shape under mechanical stress and to return to its original shape before the force was applied after the mechanical stress ceases. Rigidity refers to a resistance of a component against elastic deformation. The rigidity depends on the material of the component, on a processing of the component and the component geometry.

A constriction is intended to mean particularly a reduction in cross-section relative to the mean cross-sectional area of the housing sleeve. By reinforcement is meant an increase in cross-section as compared to a mean cross-sectional area of the housing sleeve. Specifically, the pressure sensor, housing sleeve and sensor assembly comprise an axial direction and a radial direction. The axial direction is a direction of a longitudinal extension of the pressure sensor, housing sleeve and sensor assembly. The radial direction is perpendicular to the axial direction. Cross-sections always refer to sections in radial direction of the housing sleeve.

In other words, a constriction in particular refers to a portion of the housing sleeve having a reduced wall thickness as compared to the mean wall thickness of the housing sleeve. Specifically, the constriction is a portion of the housing sleeve that has a reduced wall thickness relative to two immediately adjacent portions. Consequently, a reinforcement particularly refers to a portion of the housing sleeve having an increased wall thickness relative to a mean wall thickness of the housing sleeve. Specifically, the reinforcement is a portion of the housing sleeve that has an increased wall thickness relative to two immediately adjacent portions.

The mean value of the cross-sectional area or the wall thickness is in particular obtained over a total length of the housing sleeve in the axial direction of the pressure sensor.

A housing sleeve of this type will be easy and cost-effective in production. A desired change in length of the housing sleeve at a given pressure change is easily obtained by means of the constriction and/or reinforcement.

A pressure change is intended to mean a change in pressure to be captured by the pressure sensor and to which the membrane and at least portions of the housing sleeve are exposed in operation. Thus, this pressure to be captured exerts a force on the membrane. Particularly, this force acts as a normal force along the axial direction of the housing sleeve.

By change in length is meant a change in length along the axial direction, especially the axial direction of the housing sleeve. However, a change in length is also intended to mean a change in length in the radial direction, especially in a radial direction of the housing sleeve. Similarly, a change in length of the sensor assembly at a pressure change is intended to mean both a change in length of the sensor assembly in the axial and in the radial direction of the sensor assembly. Furthermore, the change in length is meant to be elastic and reversible. A change in length of the housing sleeve at a pressure change depends on the elastic material properties and the geometry of the housing sleeve. With respect to geometry, the cross-section or the cross-sectional profile of the housing sleeve as well as an absolute length of the housing sleeve in the axial direction are of particular importance. Accordingly, a change in length of the sensor assembly at a given pressure change depends on the elastic material properties and the geometry of the sensor assembly. Regarding the elastic material properties of the sensor assembly it must be taken into account that the sensor assembly may consist of different materials which in particular can be arranged in layers in the axial direction of the sensor assembly. Of specific importance with respect to geometry are the cross-section of the sensor assembly and an absolute length of the sensor assembly in the axial direction. If there is a difference between the change in length of the housing sleeve and the change in length of the sensor assembly this will result in mechanical stresses especially in the region of the mechanical connection of the membrane to the housing sleeve and/or within the membrane itself since the thickness of the membrane is small as compared to that of the housing sleeve.

In one embodiment the constriction is located in a region of the mechanical connection of the membrane to the housing sleeve, and in this region the constriction increases an elasticity of the housing sleeve. The region can be located at a lower end of the housing sleeve. In this way, the constriction reduces mechanical stresses in the mechanical connection of the membrane to the housing sleeve and/or within the membrane itself, especially if with a pressure change a difference occurs between the change in length for the housing sleeve and the change in length for the sensor assembly.

In another embodiment, the constriction is designed such that with a pressure change the difference between the change in length of the housing sleeve and the change in length of the sensor assembly is more or less equal to zero. Herein, a difference between the change in length of the housing sleeve and the change in length of sensor assembly that is "more or less equal to zero" means that with a pressure change the resulting change in length of the housing sleeve is lower than/equal to an elastic limit of the material of the housing sleeve and that with a change in pressure the resulting change in length of the sensor assembly is lower than/equal to an elastic limit of the material of the sensor assembly. In the sense of the present invention, elastic limit of a material refers to the level of mechanical stress below which the material is elastic, i.e. the material resumes its original shape when the mechanical stress is no longer applied. Below the elastic limit the material is non-permanently (reversibly) deformed by the mechanical stress while above the elastic limit a permanent (irreversible) plastic deformation will occur.

Especially at high pressures of more than 300 bar the difference between the change in length of the housing sleeve and the change in length of the sensor assembly is very small so that mechanical stresses in the mechanical connection of the membrane to the housing sleeve that result from this difference are lower than/equal to an elastic limit of the material of the mechanical connection of the membrane (to the housing sleeve and/or of the material of the membrane itself). This helps to prevent a permanent plastic deformation of the mechanical connection of the membrane to the housing sleeve and/or of the membrane itself that would reduce the useful life of the pressure sensor. This applies particularly to the total working range of the pressure sensor of for example 0 bar to 1500 bar (typical overload limit), especially from 0 bar to 1000 bar (normal operation).

A reinforcement of the housing sleeve is advantageous in that at high pressure a deformation of the housing sleeve will be less in the region of the reinforcement and will be less in the radial direction, in particular. At high pressures, the housing sleeve may be deformed so that a diameter of the housing sleeve in the radial direction is reduced. Seen over the absolute length of the housing sleeve this means that the housing sleeve assumes a concave bend in its middle portion. This sagging in the middle portion of the housing sleeve can be prevented by a local reinforcement. In this middle portion, the reinforcement reduces the elasticity of the housing sleeve.

In a further embodiment of the pressure sensor according to the invention, the constriction is a recess and/or groove formed in a wall of the housing sleeve, in particular a recess and/or groove extending along an inner perimeter of the housing sleeve.

The constriction may be located on the inside of the housing sleeve and/or on the outside of the housing sleeve. Hence, the constriction can correspond to an increase of the inner diameter of the housing sleeve and/or a reduction of the outer diameter of the housing sleeve.

For an increase of the inner diameter of the housing sleeve, the constriction can be approximately semicircular or triangular in shape, for example, as viewed in cross-section.

In another embodiment of the pressure sensor according to the invention, a depth of the constriction in the radial direction of the housing sleeve is about half of a mean wall thickness of the housing sleeve. A depth of the constriction in the radial direction of the housing sleeve may be in a range of 5% to 80% of the mean wall thickness of the housing sleeve, in particular in a range of 25% to 75% of the mean wall thickness of the housing sleeve, and specifically in a range of 45% to 55% of the mean wall thickness of the housing sleeve.

A width of the constriction in the axial direction of the housing sleeve can be in a range of 30% to 300% of the mean wall thickness of the housing sleeve, particularly in a range of 60% to 200% of the mean wall thickness of the housing sleeve, and especially in a range of 90% to 120% of the mean wall thickness of the housing sleeve.

The constriction can be positioned close to the lower end of the housing sleeve, i.e. close to the membrane. The constriction may be spaced apart from the lower end of the housing sleeve and/or from the membrane. Particularly, the constriction may be located on the same level as a base plate of the sensor assembly. This has been found to be particularly useful. The base plate is positioned above the membrane. In this respect, "on the same level as X" means "at the same distance or in the same distance range from the lower end of the housing sleeve as X".

In case of a reduction of the outer diameter of the housing sleeve, a height of the constriction as measured in the radial direction of the housing sleeve may be in a range of 1% to 50% of the mean wall thickness of housing sleeve, particularly in a range of 3% to 30% of the mean wall thickness of the housing sleeve, and in particular in a range of 5% to 15% of the mean wall thickness of the housing sleeve. A width of the constriction as measured in axial direction of the housing sleeve may be a multiple of the height of the constriction. The constriction may extend from the lower end of the housing sleeve upwards. In particular, the constriction may be positioned on a level of the lower half of a base plate of the sensor assembly.

The reinforcement may be located on the inside of the housing sleeve, i.e. the reinforcement may correspond to a reduction of the internal diameter of the housing sleeve. A height of the reinforcement as measured in radial direction of the housing sleeve may be in a range of 1% to 50% of the mean wall thickness of the housing sleeve, especially in a range of 3% to 30% of the mean wall thickness of the housing sleeve, and in particular in a range of 5% to 15% of the mean wall thickness of the housing sleeve. A width of the reinforcement as measured in an axial direction of the housing sleeve may be a multiple of the height of the reinforcement. A width of the reinforcement may also be a multiple of the width of the constriction, regardless of where the constriction is located.

By "above X" is meant "farther away from the lower end of the housing sleeve than X". By "below X" is meant "closer to the lower end of the housing sleeve than X". If the constriction is formed by an increase of the inner diameter of the housing sleeve the reinforcement may be adjacent to the constriction. The reinforcement may be located on the same level as the sensor assembly and in particular above a base plate of the sensor assembly. The reinforcement may be located above the constriction if the constriction is formed by reducing the outer diameter of the housing sleeve.

It was found that the pressure sensor according to the invention can be used for capturing pressures of more than 300 bar, in particular more than 500 bar, specifically more than 750 bar, for example. Especially pressures up to 1000 bar can be captured in at least 108 pressure cycles. Moreover, the pressure sensor of the invention can readily be used up to an overload limit of 1500 bar without being damaged or otherwise changing its properties.

For the purpose herein, the membrane may be a smooth disc, in particular a circular disc preferably attached to the housing sleeve at an edge portion thereof. A thickness of the membrane preferably is 50 µm to 200 µm, in particular 75 µm to 175 µm, and specifically 100 µm to 150 µm. A membrane having an indentation or an otherwise complex geometry is not required. Thus, a very inexpensive membrane may be used. The membrane may be made of mechanically robust and rigid material such as pure metals, nickel alloys, cobalt alloys, iron alloys, etc.

In this way, especially the mechanical stresses arising within the membrane, in particular in the radial direction, and the mechanical stresses arising within the mechanical connection of the membrane to the housing sleeve may always be kept below the elastic limit of the material of the membrane as well as that of the mechanical connection of the membrane to the housing sleeve. The variations in length of the housing sleeve and the sensor assembly being exactly the same, almost no or no additional mechanical stresses will occur within the membrane during a pressure change which will significantly increase the useful life of the pressure sensor.

The housing sleeve may be tube-shaped and may have two open ends. One of the two open ends of the housing sleeve is used for pressure measurement, for example. In the following, this end of the housing sleeve will be referred to as the lower end of the housing sleeve. The lower end of the housing sleeve may be in mechanical connection to the membrane. The mechanical connection of the membrane to the housing sleeve may be for example a connection by material-bonding. A connection by material-bonding may be, for example, a welded connection. The other end of the housing sleeve is typically used for receiving and transferring the measurement signal and for mounting the pressure sensor in an object. In the following, this end will be referred to as the upper end of the housing sleeve. The upper end of the housing sleeve may be in mechanical connection to an upper housing portion. Since the upper housing portion may have a much larger cross-sectional area than the housing sleeve, a change in axial length of the upper housing portion due to a pressure change may be small as compared to a change in axial length of the housing sleeve. In addition, a change in axial length of the upper housing portion, especially of that part of the upper housing portion that is located above a mechanical connection of the housing sleeve to the upper housing portion, has the same effect on the absolute positions of both the lower end of the housing sleeve and the lower end of the sensor assembly. The change in length of the part of the upper housing portion that is located below the mechanical connection of the housing sleeve to the upper housing portion contributes to the change in length of the sensor assembly. Thus, a change in axial length of the housing sleeve corresponds to a change of the absolute position of the lower end of the housing sleeve in axial direction, and a change in axial length of the sensor assembly corresponds to a change of the absolute position of the lower end of the sensor assembly in axial direction. Exactly the same amount of change in the axial length of the housing sleeve and the sensor assembly therefore means that there will be no relative movement in the axial direction between the lower end of the housing sleeve and the lower end of the sensor assembly.

The upper end of the housing sleeve may comprise a flange for inserting the pressure sensor into the object whose pressure is to be captured. The housing sleeve may be made of mechanically resistant and rigid material such as pure metals, nickel alloys, cobalt alloys, iron alloys, etc.

The housing sleeve and the membrane attached thereto protect the sensor assembly from the medium whose pressure is to be captured by the pressure sensor.

A pressure sensor according to the invention may in particular capture a pressure change as a function of time with a temporal resolution of up to 100 kHz. In addition, the pressure sensor may be fabricated with very small dimensions. With respect to an outer diameter, this may be in the range of 4 mm to 8 mm, especially in the range of 5.5 mm to 6.5 mm and in particular of 5.5 mm, and a height may be in the range of 10 mm to 20 mm, especially in the range of 13 mm to 17 mm, and in particular 15 mm so that the pressure sensor may be even used in objects where the installation space is limited.

Preferably, the housing sleeve has an elasticity that varies in the axial direction of the housing sleeve.

In another embodiment of the pressure sensor according to the invention, the sensor assembly comprises at least one piezoelectric element which generates electric polarization charges under a force.

Particularly, the force in this case refers to a normal force. The normal force may be transferred from the membrane in the axial direction of the sensor assembly onto the piezoelectric element of the sensor assembly.

A piezoelectric element is perfectly suitable for capturing the normal force because the polarization charges can be measured by electrical means and converted into an electrical signal.

Piezoelectric elements can be piezoelectric discs or bars. The sensor assembly may comprise an odd number of piezoelectric elements, for example 1, 3, 5, 7, and so on. Piezoelectric discs may be stacked in the sensor assembly.

The piezoelectric element may be made of a piezoelectric crystal material such as quartz (SiO2 single crystal), calcium gallo-germanate (Ca3Ga2Ge4O14 or CGG), langasite (La3Ga5SiO14 or LGS), tourmaline, gallium ortho-phosphate, etc. Other materials can also be used, for example, piezorestrictive materials.

In a further embodiment of the pressure sensor according to the invention, the sensor assembly comprises a pretensioning arrangement which includes a pretensioning sleeve and a base plate. In this case, the piezoelectric element is arranged in the pretensioning arrangement.

The pretensioning arrangement ensures a very tight electrical contact between the piezoelectric elements and the electrodes of the pressure sensor so that there will be no non-contact areas with local high electrical voltages and electrical leakage currents and, in addition, surface roughnesses on the contact surfaces will be eliminated to obtain an excellent linearity of the pressure sensor. Linearity refers to a deviation from the proportionality between the electric polarization charges generated under a load and the pressure to be detected. The pretensioning arrangement may be made of mechanically resistant and rigid material such as pure metals, nickel alloys, cobalt alloys, iron alloys, etc.

In another embodiment of the pressure sensor according to the invention, the pretensioning arrangement is arranged in the housing sleeve. The base plate is located between the membrane and the piezoelectric element. In particular, the base plate establishes a connection between membrane and piezoelectric element.

Thus, the pressure to be captured will be very well transmitted as a normal force by the membrane to the base plate and from there to the piezoelectric element.

In another embodiment of the pressure sensor according to the invention, the membrane is mechanically connected to the base plate of the pretensioning arrangement.

For example, the mechanical connection of the membrane to the base plate may be a connection by material-bonding. A connection by material-bonding may be for example a welded connection. In particular, the membrane may be connected to the base plate through one or more annular welded connections. In this way, it is possible to improve the force transmission from the membrane to the base plate and to increase the lifetime of the membrane and the base plate. Furthermore, the linearity of the pressure sensor is further improved.

In another embodiment of the pressure sensor according to the invention, the piezoelectric element comprises electrodes for receiving and transmitting the electric polarization charges generated under a force.

The electric polarization charges may be received by the electrodes and transmitted as output signals. If a plurality of piezoelectric elements are used in a sensor assembly, electric polarization charges from different piezoelectric elements having the same polarity may be combined via the electrodes and transmitted as output signals. Thus, electric polarization charges having the same polarity may be transmitted to a seismic mass and be transmitted as output signals via a spring contact from a front face of the seismic mass. Such a pickoff of output signals by a spring contact is easy and inexpensive to mount.

In another embodiment of the pressure sensor according to the invention, a form-locking connection is established between the pretensioning sleeve and the base plate.

The form-locking connection between pretensioning sleeve and base plate may be for example achieved by suspending the base plate in the pretensioning sleeve.

A form-locking connection between pretensioning sleeve and base plate ensures a good transmission of the pretensioning force from the pretensioning sleeve to the base plate. Pretensioning sleeves and base plates suitable for this purpose are convenient and easy in manufacture.

In another embodiment of the pressure sensor according to the invention, the base plate comprises a base plate recess.

The base plate recess may be a notch and/or a groove, especially an annular groove, formed in the base plate, for example. Thus, the base plate recess corresponds to a reduction in the cross section of the base plate. Cross-sectional area refers to a cross-sectional area transverse to the axial direction of the housing sleeve. The base plate recess can be located on the locally cylindrical outside of the base plate. The base plate recess can be positioned between the piezoelectric element and the membrane, and in particular between the piezoelectric element and a form-locking connection between the base plate and the pretensioning sleeve. In this way, the base plate recess may be placed close to the piezoelectric element and/or close to the form-locking connection between the base plate and the pretensioning sleeve.

By means of the base plate recess the mechanical stresses in the piezoelectric element can be reduced. Together with the housing sleeve and sensor assembly that are optimally compatible in accordance with the invention, the compressive strength of the pressure sensor can be unexpectedly further improved.

In another embodiment of the pressure sensor according to the invention, the dimensions of the base plate recess are such that within the working range of the pressure sensor mechanical stresses in the piezoelectric element are smaller than a breaking limit of the material of the piezoelectric element. The breaking limit is a material property and is equivalent to the mechanical tensile stress which the material can withstand before it breaks. By means of the base plate recess, mechanical stresses in the piezoelectric element may be reduced to an amount that is safely below the breaking limit of the material of the piezoelectric element, which in turn increases the useful life of the pressure sensor.

Further advantageous embodiments and combinations of features of the invention will be apparent from the following detailed description and the claims in their entirety.

BRIEF DESCRIPTION OF THE DRAWINGS

The drawings are used to illustrate the embodiment wherein.

Throughout the Figures, corresponding parts are designated by the same reference numerals.

DESCRIPTION OF EXEMPLARY EMBODIMENTS OF THE INVENTION

Figure 1:
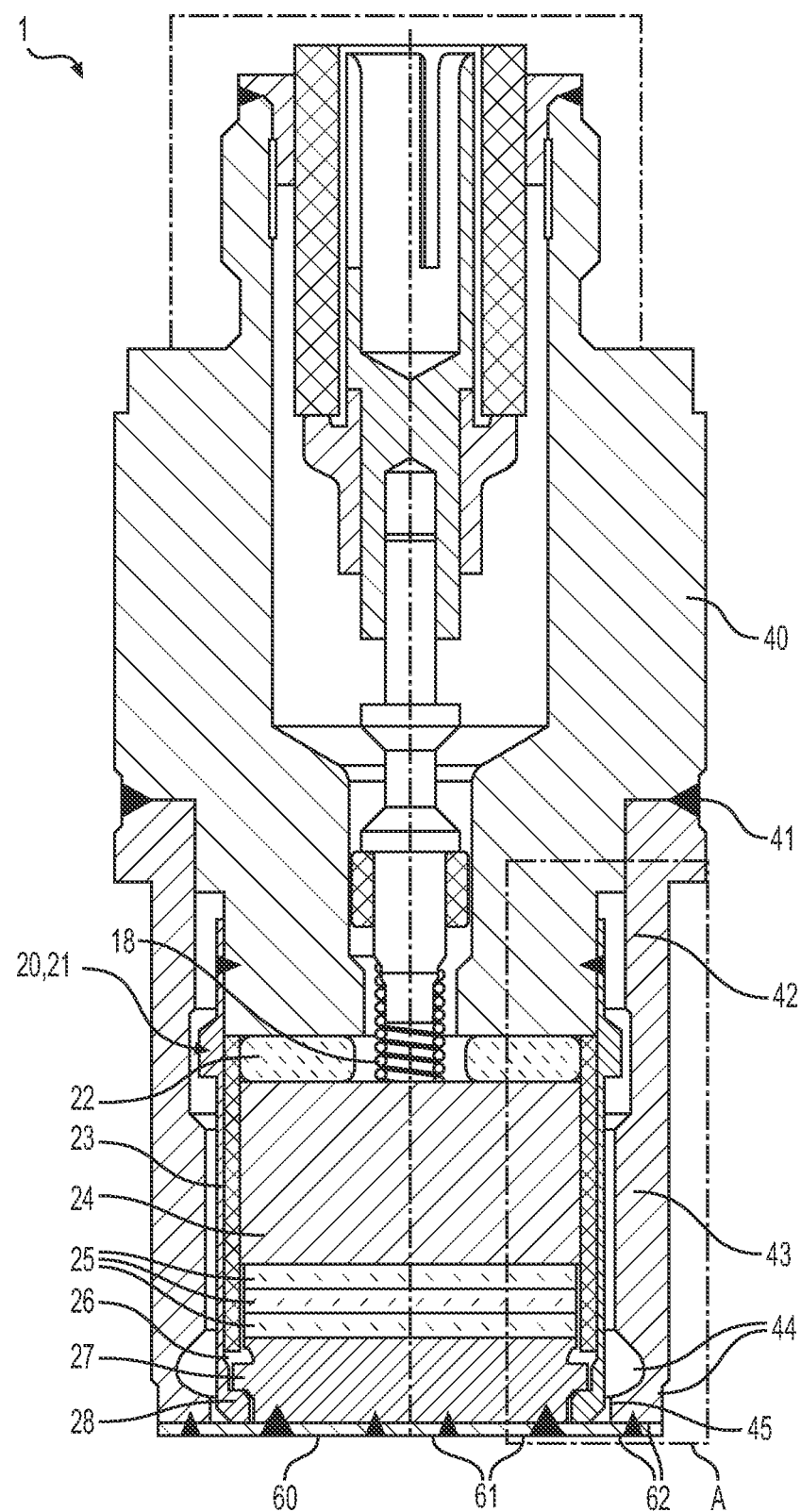
FIG. 1 shows an embodiment of a pressure sensor cut in the axial direction.

FIG. 1 shows an embodiment of the pressure sensor 1 according to the invention cut along its longitudinal extension. The cut is a longitudinal cut in an axial direction. In FIG. 1, the axial direction is represented as a dotted axis that extends from bottom to top in FIG. 1 basically through the middle of the pressure sensor 1 and all of its components shown. A radial direction is perpendicular to the axial direction. The radial direction is not shown in FIG. 1 and extends from left to right in FIG. 1 through the pressure sensor 1 and all its components shown.

Pressure sensor 1 comprises a sensor assembly 20 and a pretensioning arrangement 21. Pretensioning arrangement 21 consists of a cylindrical pretensioning sleeve 23 and a cylindrical base plate 27. The pretensioning sleeve 23 is connected hermetically and under tension to the upper housing portion 40. Base plate 27 is suspended in the pretensioning sleeve 23 in a form-locking manner via a recess 28 that protrudes inwards in the radial direction for absorbing the tension of the pretensioning sleeve 23.

In the pretensioning assembly 21 are arranged—under pretension—in a stack, from bottom to top in FIG. 1, first three disc-shaped piezoelectric elements 25 with electrodes (not shown), above them a seismic mass 24 and on top of that another piezoelectric element 22.

Figure 2:
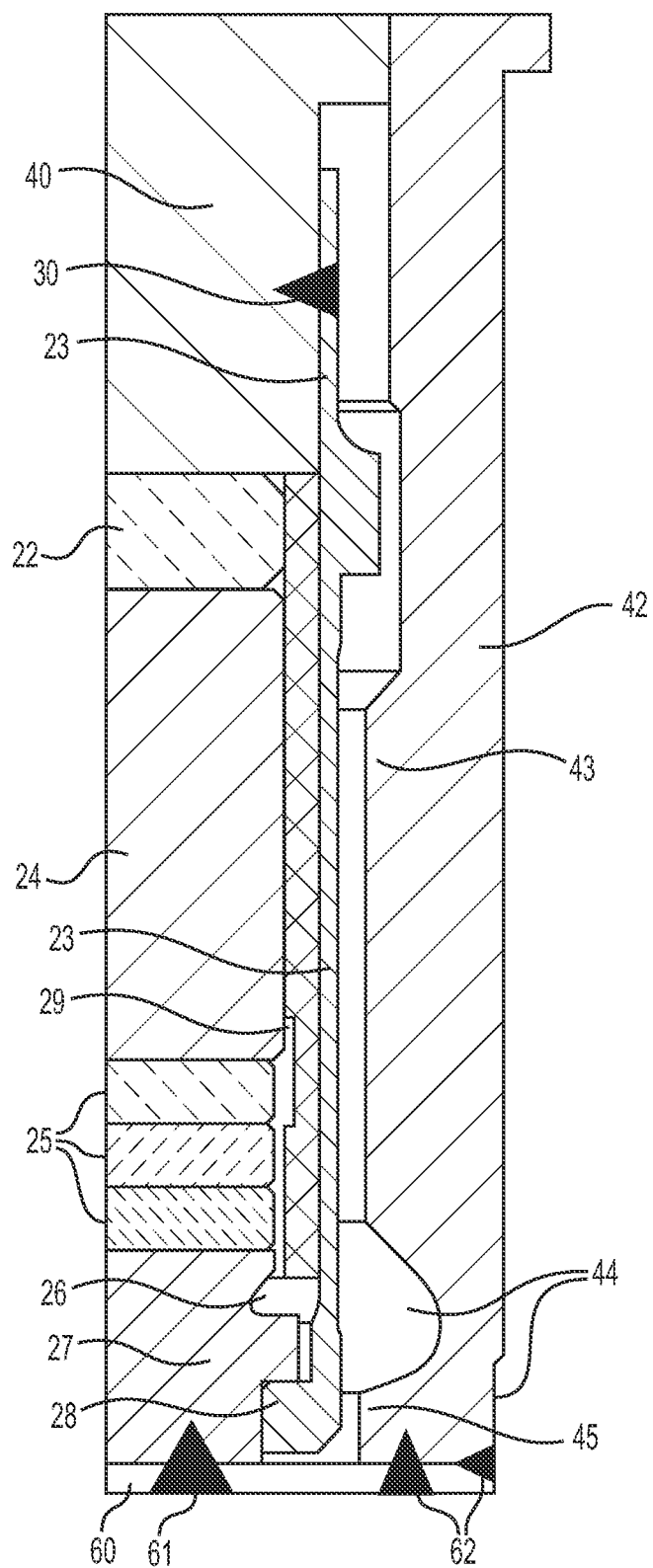
FIG. 2 represents a detailed view of the boxed portion A of FIG. 1.

Sensor assembly 20 is accommodated in a cylindrical housing sleeve 42 the upper end of which is bonded to the upper housing portion 40 by means of a first welded connection 41. Housing sleeve 42 comprises a reinforcement 43 extending concentrically in a middle portion around the perimeter thereof. This reinforcement 43 is formed by increasing the wall thickness of the housing sleeve 42 on the inside of the latter. The inner diameter of the housing sleeve 42 in the region of the reinforcement 43 is smaller than the mean inner diameter of housing sleeve 42. Below reinforcement 43, i.e. in a region of the mechanical connection of the membrane 60 to the housing sleeve 42, a constriction 44 in the form of a concave circumferential groove or recess is formed adjacent to reinforcement 43. Constriction 44 is arranged on the inside of the housing sleeve. Constriction 44 is formed by a gradually increasing the inner diameter of housing sleeve 42 from the minimum inner diameter of the reinforcement 43 to a maximum inner diameter. As shown in FIG. 2 for example, a shape in cross-section of constriction 44 resembles that of one half of a drop. In the region of constriction 44 the wall thickness of housing sleeve 42 at its thinnest point adjacent the maximum inner diameter thereof is about half of the mean wall thickness of housing sleeve 42. Below constriction 44 on the inside is a portion that comprises a flange 45. In the region of flange 45, another constriction 44 is formed in the outer wall of the housing sleeve 42, said further constriction 44 in the outer wall of housing sleeve 42 being characterized by a reduction of the outer diameter of the housing sleeve 42.

Flange 45 serves as the actual mechanical connection of the membrane 60 to the housing sleeve 42. The disc-shaped membrane 60 having a thickness of e.g. 130 µm measured in the axial direction of the sensor 1 hermetically seals the lower end of housing sleeve 42 due to a housing sleeve welded connection 62. As shown in FIG. 2 for example, this housing sleeve welded connection 62 is formed by two annular concentric welded connections wherein one annular welded connection of the two annular concentric welded connections connects the outside of housing sleeve 42 to the outside of membrane 60 and another annular welded connection of the two annular concentric welded connections 62 connects the membrane 60 to the lower surface of housing sleeve 42 from below. Furthermore, a base plate annular welded connection 61 connects membrane 60 and base plate 27. The base plate annular welded connection 61 is provided as two additional annular concentric welded connections.

FIG. 2 shows a detailed view of the boxed portion A in FIG. 1. A second annular welded connection 30 connects the pretensioning sleeve 23 and the upper housing portion 40. The housing sleeve 42 comprising reinforcement 43, constrictions 44 and flange 45 is represented in an enlarged view. Between as well as above and below the three disc-shaped piezoelectric elements 25 are located electrodes 29 whose connecting tabs are arranged on the outside of the three disc-shaped piezoelectric elements 25 and are bent upwards away from and perpendicular to the membrane 60 to lie between the three disc-shaped piezoelectric elements 25 and the pretensioning sleeve 23. An elastically insulating sleeve 17 is provided for mechanically holding together the piezoelectric elements 22, 25 and the seismic mass 24. Base plate 27 comprises the base plate recess 26 in the form of a concave circumferential groove therein. For a more clear understanding, most of the reference numerals as already shown in FIG. 1 are represented also in FIG. 2. However, the complete explanation will not be repeated.

Figure 3:
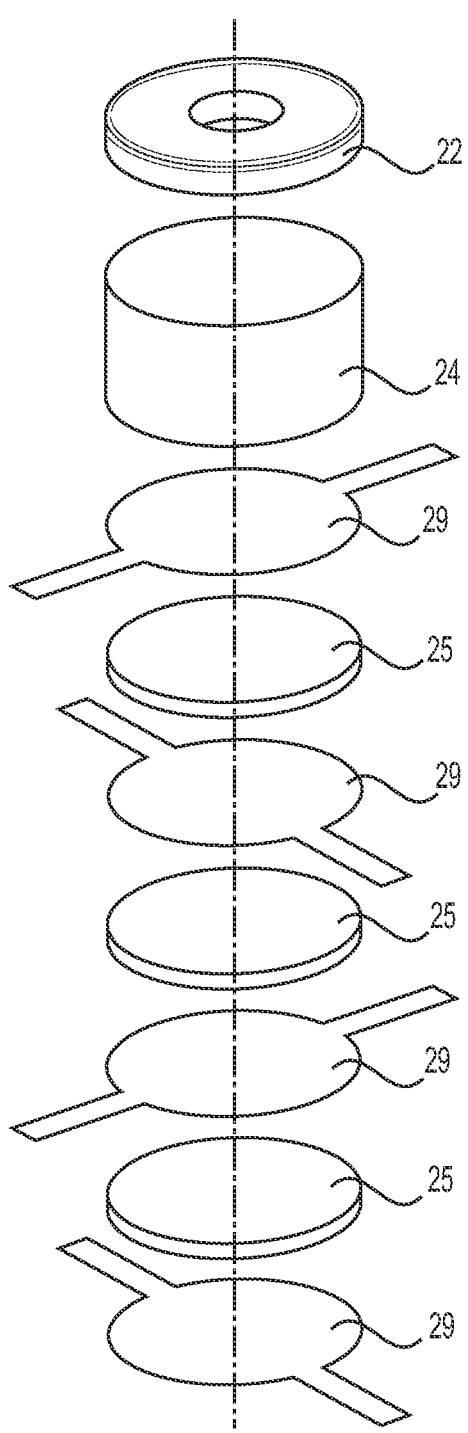
FIG. 3 shows an exploded view of a sensor assembly without base plate and without pretensioning sleeve.

FIG. 3 shows an exploded view of a sensor assembly 20, however, without pretensioning sleeve 23 and without base plate 27. The electrodes 29 and the disc-shaped piezoelectric elements 25 are stacked onto each other in an alternating manner. Two out of the four electrodes 29 connect the surfaces of piezoelectric discs 25 that have the same polarity. Above and adjacent to the top electrode 29 is placed the seismic mass 24 and on top of that follows the additional piezoelectric element 22. For an accelerated movement of the pressure sensor 1 in the axial direction, seismic mass 24 and additional piezoelectric element 22 generate electric polarization charges which are used as compensating electric charges. The compensating electric charges have a polarity opposite to that of the piezoelectric polarization charges generated by the accelerated movement of pressure sensor 1 at the piezoelectric elements 25 and received and transmitted from the uppermost and the third electrodes 29 as viewed from the top of the stack and used as the output signals. Output signals and compensating electric charges are combined via the seismic mass. In this way, acceleration compensation of the pressure sensor 1 is achieved. As shown in FIG. 1, a spring contact 18 receives the output signals from a front face of seismic mass 24. These signals then can be forwarded at a socket for a plug connector of a signal cable to an evaluation unit. The socket is attached at a side of the upper housing portion 40 that faces away from the membrane 60.

Figure 4:
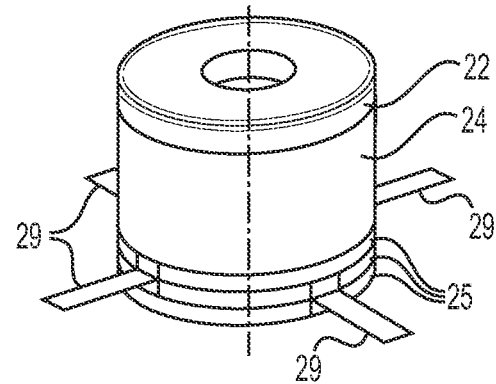
FIG. 4 shows a side view of a sensor assembly in the assembled state with the electrodes welded thereto (without base plate and without pretensioning sleeve)

FIG. 4 shows a side view of a sensor assembly 20 according to FIG. 3 in the assembled state (without base plate 27 and without pretensioning sleeve 23) with electrodes 29 welded thereto.

Figure 5:
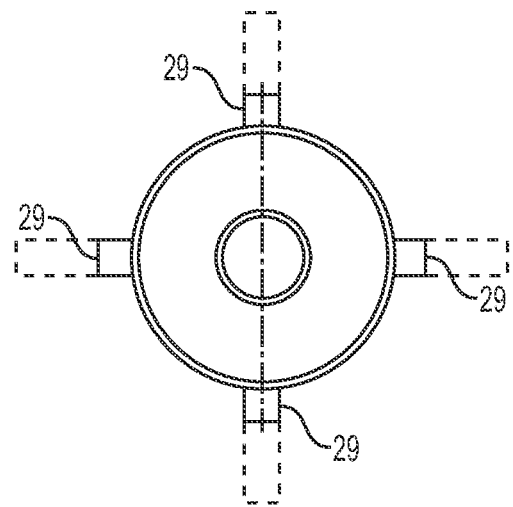
FIG. 5 represents a top view of a sensor assembly in the assembled state with the electrodes welded thereto (without base plate and without pretensioning sleeve)

FIG. 5 shows a top view of a sensor assembly 20 according to FIGS. 3 and 4 in the assembled state (without base plate 27 and without pretensioning sleeve 23) with electrodes 29 welded thereto.

Figure 6:
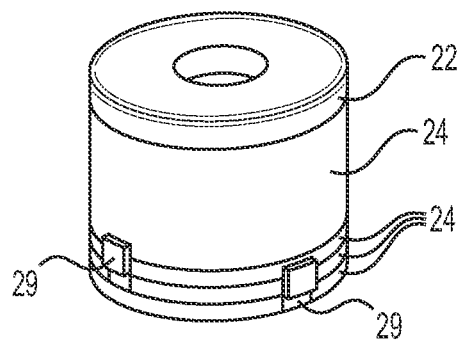
FIG. 6 represents a side view of a sensor assembly in the assembled state with the electrodes welded thereto and bent upwards (without base plate and pretensioning sleeve).

FIG. 6 shows a side view of a sensor assembly in the assembled state 20 according to FIGS. 3-5 (without base plate 27 and without pretensioning sleeve 23) with electrodes 29 welded thereto and bent upwards suitable for installation in a pretensioning assembly 21 consisting of a base plate 27 (not shown) and a pretensioning sleeve 23 (not shown).

Experiments have shown that pressures up to 1000 bar in at least $10^6$ pressure cycles can be measured by means of the pressure sensor 1 and have further shown that the pressure sensor 1 can be readily used up to an overload limit of 1500 bar. This is also true for fast pressure changes of up to 100 kHz.

However, the pressure sensor 1 is not limited to the embodiment described above and may be modified as desired within the scope of the invention.

Thus, in principle it is not necessary for the pressure sensor 1 or the cylindrical housing sleeve 42 to be circular but it can have different shapes, such as rectangular. It is also possible to provide a sensor assembly that is different from sensor assembly 20, e.g. one with bar-shaped piezoelectric elements arranged adjacent to each other. Also a membrane may be provided that is different in shape, e.g. non-flat or arched, for example. Further modifications will be apparent to those skilled in the art on the basis of their knowledge and expertise.

In summary, the pressure sensor according to the invention having a simple disc-shaped membrane is able to capture high pressures over a long useful life due to the reinforcements and constrictions formed in the housing sleeve. It shall be noted that the pressure sensor is small in dimensions so that it is ideal for use even in a limited installation space. Furthermore, it shall be noted that the pressure sensor comprises vibrations compensation and is able to also capture pressure profiles that change with time.

LIST OF REFERENCE NUMERALS

1 pressure sensor
17 elastically insulating sleeve
18 spring contact
20 sensor assembly
21 pretensioning arrangement
22 further piezoelectric element
23 pretensioning sleeve
24 seismic mass
25 piezoelectric element
26 base plate recess
27 base plate
28 form-locking connection
29 electrodes
30 second welded connection
40 upper housing portion
41 first welded connection
42 housing sleeve
43 reinforcement
44 constriction
45 flange
60 membrane
61 base plate annular welded connection
62 housing sleeve welded connection

What is claimed is:

1. A pressure sensor for capturing pressures of up to 1000 bar, the pressure sensor defining an axial direction and a radial direction that extends perpendicular to the axial direction, the pressure sensor comprising:
    a) a housing sleeve that defines a constriction in which the elasticity of the housing sleeve is locally increased relative to the elasticity of the rest of the housing sleeve, wherein the housing sleeve defines an inner perimeter, and the restriction defines a recess that is formed along the inner perimeter of the housing sleeve;
    b) a sensor assembly disposed within the housing sleeve, wherein the sensor assembly includes a pretensioning arrangement that includes a pretensioning sleeve; and
    c) a membrane defining a uniform thickness measured in the axial direction, wherein the membrane is configured for transmitting a pressure and mechanically connected with the housing sleeve such that the pressure acts in the axial direction on the membrane, the membrane further connected operatively with the sensor assembly, wherein the constriction is disposed in the vicinity of where the membrane is mechanically connected to the housing sleeve; wherein the pretensioning sleeve is radially separated from the housing sleeve in the vicinity of where the membrane is mechanically connected to the housing sleeve; wherein when the pressure acts in the axial direction on the membrane and in the radial direction on the housing sleeve then reversible changes in the length of the housing sleeve along the axial direction and the radial direction are commensurately effected in a manner that reduces a diameter of the housing sleeve in the radial direction.

2. The pressure sensor according to claim 1, wherein the constriction is configured such that the reversible changes in the length of the housing sleeve occur along the axial direction.

3. The pressure sensor according to claim 1, wherein the constriction is configured such that the reversible changes in the length of the housing sleeve occur along the radial direction.

4. The pressure sensor according to claim 1, wherein the housing sleeve defines a reinforcement in which the elasticity of the housing sleeve is locally reduced relative to the elasticity of the rest of the housing sleeve, the reinforcement being spaced apart from the constriction.

5. The pressure sensor according to claim 4, wherein the reinforcement and the constriction are configured such that the reversible changes in the length of the housing sleeve occur along the axial direction.

6. The pressure sensor according to claim 4, wherein the reinforcement and the constriction are configured such that the reversible changes in the length of the housing sleeve occur along the radial direction.

7. The pressure sensor according to claim 1, wherein a depth of the constriction in a radial direction is about half of a mean wall thickness of the housing sleeve.

8. The pressure sensor according to claim 4, wherein the reinforcement is located in a middle portion of the housing sleeve and configured such that at high pressure a diameter of the housing sleeve in the middle portion is reduced in the radial direction.

9. The pressure sensor according to claim 8, wherein the reinforcement is configured such that at high pressure the housing sleeve assumes a concave bend in the middle portion with respect to the overall length of the housing sleeve.

10. The pressure sensor according to claim 1, wherein the constriction is configured such that at high pressure a difference between a change in length of the housing sleeve and a change in length of the sensor assembly is more or less equal to zero.

11. The pressure sensor according to claim 1, wherein with a change in pressure a change in length of the housing sleeve resulting therefrom is equal to no more than an elastic limit of a material of the housing sleeve.

12. The pressure sensor according to claim 11, wherein at high pressure a change in length of the sensor assembly is equal to no more than an elastic limit of a material of the sensor assembly.

13. The pressure sensor according to claim 1, wherein at high pressures of more than 300 bar the difference between the change in length of the housing sleeve and the change in length of the sensor assembly is so low that mechanical stresses within the mechanical connection between the membrane and the housing sleeve resulting from said difference are equal to less than an elastic limit of the material of the mechanical connection between the membrane and the housing sleeve.

14. The pressure sensor according to claim 1, wherein at high pressures of more than 300 bar the difference between the change in length of the housing sleeve and the change in length of the sensor assembly is so low that mechanical stresses within the mechanical connection between the membrane and the housing sleeve resulting from said difference are equal to less than an elastic limit of the material of the membrane itself.

15. The pressure sensor according to claim 1, wherein the sensor assembly includes at least one piezoelectric element that generates electric polarization charges under an applied force; and wherein the at least one piezoelectric element is arranged in said pretensioning arrangement.

16. The pressure sensor according to claim 9, wherein the membrane is connected to the base plate of the pretensioning arrangement by material-bonding.

17. The pressure sensor according to claim 15, wherein the at least one piezoelectric element includes electrodes for receiving and transmitting the electric polarization charges generated under the force.

18. The pressure sensor according to claim 15, further comprising a spring contact and a seismic mass disposed within the pretensioning sleeve, the seismic mass having a front face touching the spring contact, wherein the at least one piezoelectric element is configured and disposed such that electrical polarization charges of the same polarity used as the output signals are transmitted via the spring contact to the front face of the seismic mass.

19. The pressure sensor according to claim 15, wherein the pretensioning sleeve is in form-locking connection to the base plate; wherein the base plate has a base plate recess that is dimensioned such that in the working pressure range of the pressure sensor mechanical stresses within the piezoelectric element are lower than a breaking limit of the material of the piezoelectric element.

* * * * *